Feb. 7, 1950 H. E. CHURCHILL 2,496,906
SPRING SUSPENSION FOR VEHICLES
Filed July 16, 1947 3 Sheets-Sheet 1

INVENTOR.
Harold E. Churchill
BY Brown, Jackson, Boettcher & Dienner.
ATTORNEYS

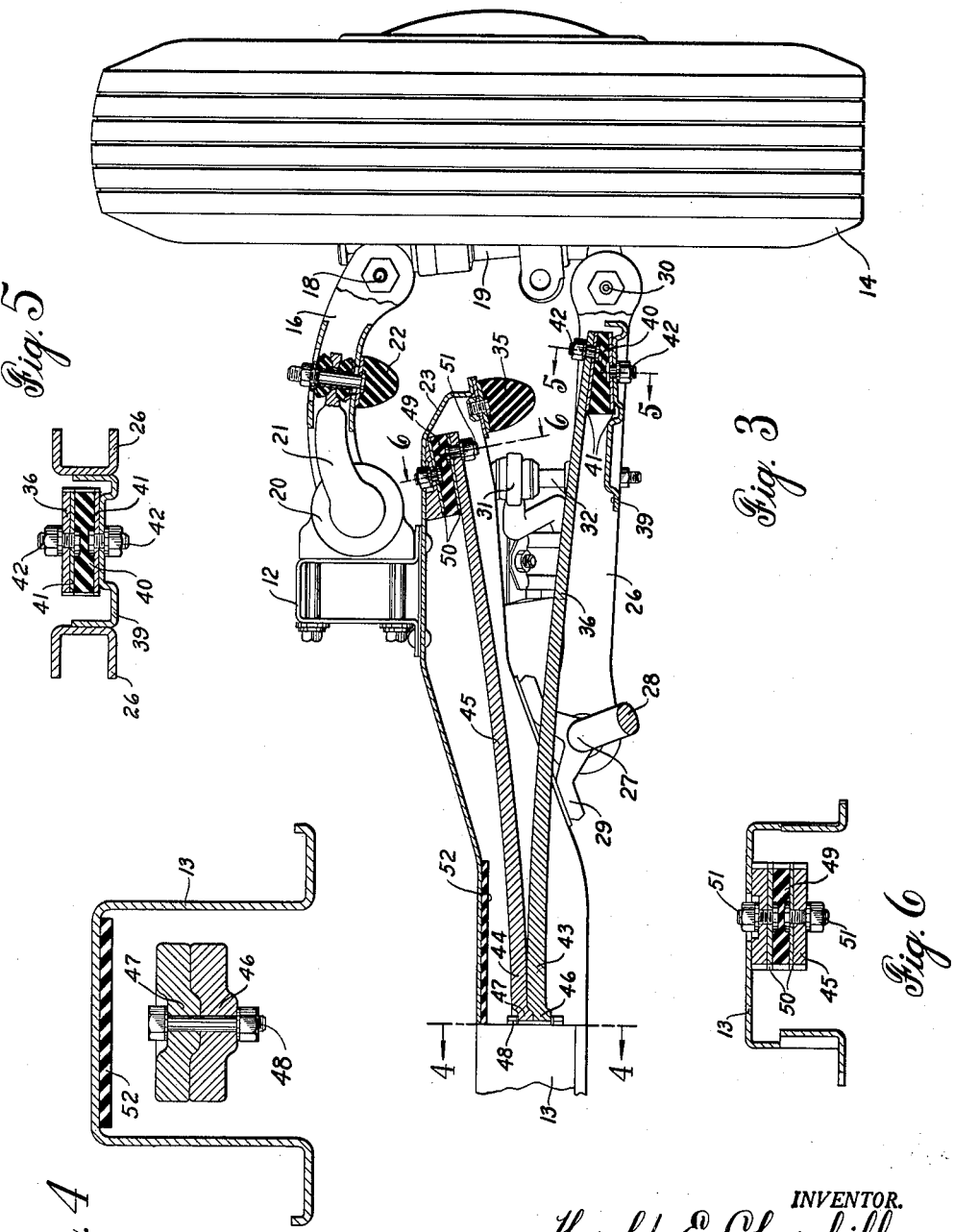

Feb. 7, 1950        H. E. CHURCHILL        2,496,906
SPRING SUSPENSION FOR VEHICLES
Filed July 16, 1947        3 Sheets-Sheet 3
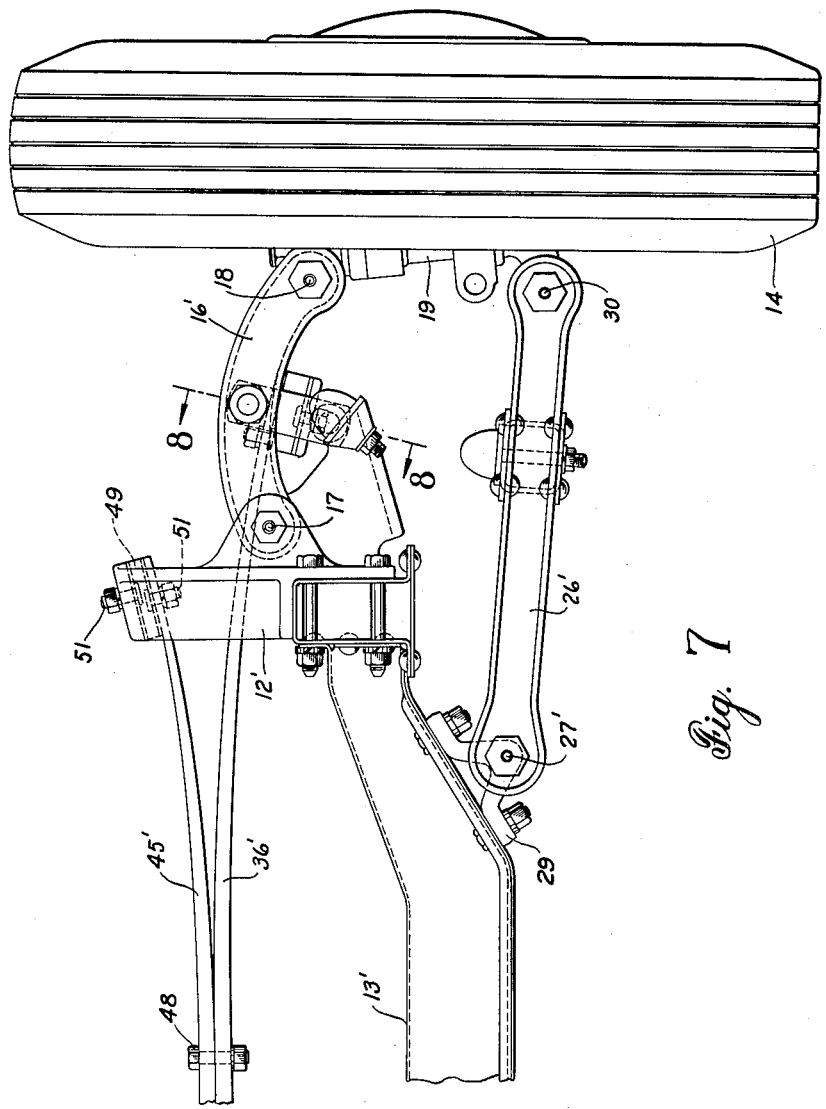
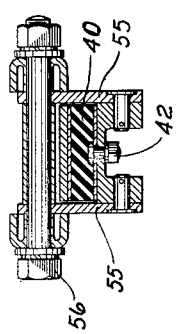
INVENTOR.
BY *Harold E. Churchill*
*Brown, Jackson, Boettcher & Dienner*
ATTORNEYS Patented Feb. 7, 1950

2,496,906

UNITED STATES PATENT OFFICE 2,496,906

SPRING SUSPENSION FOR VEHICLES

Harold E. Churchill, South Bend, Ind., assignor to The Studebaker Corporation, South Bend, Ind., a corporation of Delaware Application July 16, 1947, Serial No. 761,356

6 Claims. (Cl. 267—19)

This invention relates, generally, to automotive spring suspensions, and it has particular relation to spring suspensions that are arranged to cooperate with the front wheel supports.

Among the objects of this invention are: To increase the flexibility of the spring suspension for the front end of an automotive vehicle; to provide smooth operation of such a spring suspension; to spring individually the frame of the automotive vehicle and the rockably mounted upper and lower control arms which are supported by the front wheels; to employ a pair of coextensive transverse leaf spring members and attach the ends of one to the frame and the ends of the other to either the upper or lower control arms; to attach the ends of the leaf spring members by pads of resilient material; to position the leaf spring members so that their intermediate portions are out of engagement with the frame; and to hold the leaf spring members in mutual engagement intermediate their ends and prevent relative bodily movement thereof.

Other objects of this invention will, in part, be obvious and in part appear hereinafter.

This invention is disclosed in the embodiments thereof shown in the accompanying drawings, and it comprises the features of construction, combination of elements, and arrangement of parts which will be exemplified in the construction hereinafter set forth, and the scope of the application of which will be indicated in the appended claims.

For a more complete understanding of the nature and scope of this invention, reference may be had to the following detailed description, taken together with the accompanying drawings, in which:

Figure 3 is a partial longitudinal sectional view, at an enlarged scale, of the spring suspension shown in Figure 2;

Figures 4, 5 and 6 are detail sectional views taken along the lines 4—4, 5—5, and 6—6 of Figure 3;

Figure 7 is a view, similar to Figure 3, but showing another embodiment of the invention; and Figure 8 is a detail sectional view taken along the line 8—8 of Figure 7.

Figure 1:
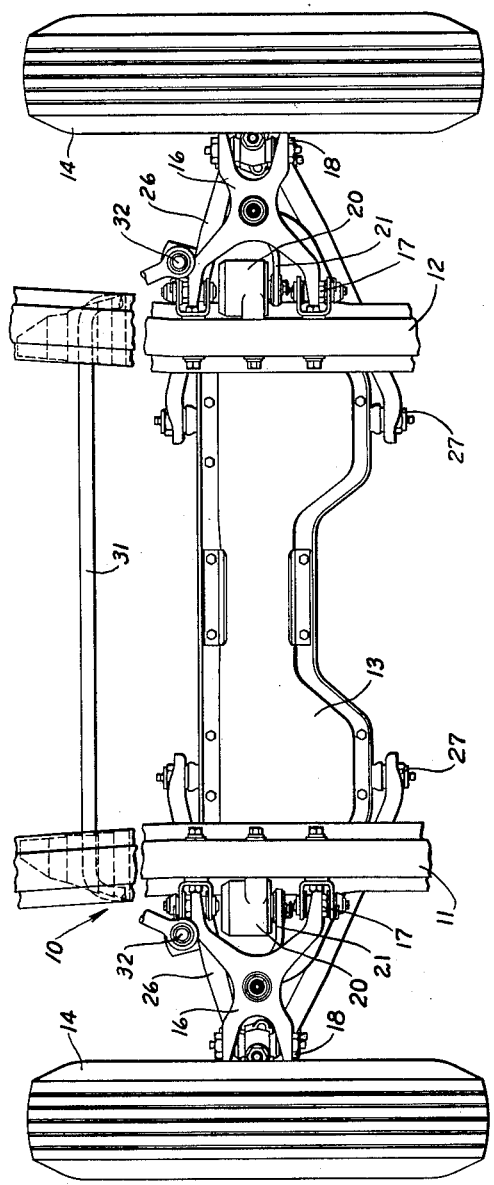
Figure 1 is a top plan view of a spring suspension for an automotive vehicle in which one embodiment of this invention is incorporated.
Figure 2:
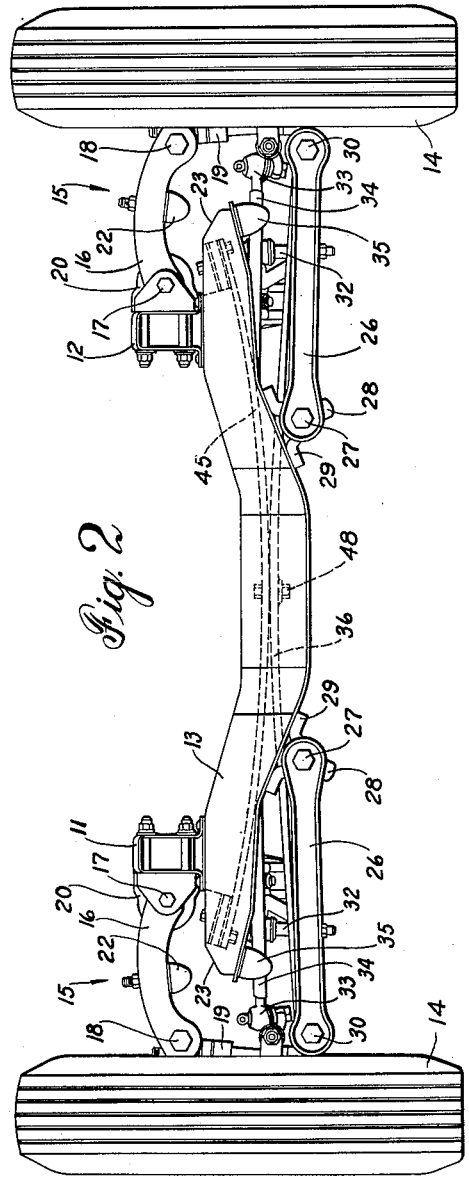
Figure 2 is a view, in front elevation, of the mechanism illustrated in Figure 1.

Referring now particularly to Figures 1 and 2 of the drawings, it will be noted that the reference character 10 designates, generally, the frame of an automotive vehicle which may include side rails 11 and 12 interconnected at the front end by a transverse frame member 13. The front wheels for the vehicle are shown at 14 and they are arranged to support the front end of the vehicle by means of support assemblies, shown generally at 15, which include upper control arms 16 that may be pivoted at 17 to the side rails 11 and 12, as shown. The other ends of the upper control arms 16 are pivoted at 18 to the upper ends of king pins 19 from which axles extend into the wheels 14 as will be understood readily. Shock absorbers 20 are secured to the side rails 11, as shown in Figure 1, and they have arms 21 which are resiliently connected to the upper control arms 16, as shown in Figure 3. Resilient bumpers 22 of rubber or the like are secured to the underside of the upper control arms 16 and are arranged to engage surfaces 23 at the ends of the transverse frame member 13 in the usual manner.

Each of the assemblies 15 also includes a lower control arm 26. As shown in Figure 1, the lower control arm 26 and also the upper control arm 16 are generally of wishbone shape and they may be formed of sheet metal stampings in accordance with conventional practise. Each of the lower control arms 26 is pivoted by a transverse shaft 27 having an underhung intermediate section 28 on support brackets 29 that are carried by the underside of the transverse frame member 13. The other ends of the lower control arms 26 are pivoted at 30 near the lower ends of the king pins 19. A stabilizer or tie rod 31, Figure 1, is connected by pins 32 to the lower control arms 26 to limit the rolling motion of the vehicle.

Conventional steering knuckles 33 are connected to the lower ends of the king pins 19 and steering rods 34 extend therefrom to the steering apparatus. Additional bumpers 35 of rubber, or the like, are secured to the underside of the transverse frame member 13 near its ends, as shown in Figure 2, and they are arranged to engage the upper surface of a lower transverse leaf spring member 36 in limiting the movement of the wheels 14 relative to the frame 10.

As shown more clearly in Figures 3 and 5 of the drawings, each end of the lower transverse substantially semi-elliptic leaf spring member 36 is mounted on a spring support bracket 39 that may be secured, as by welding, to each of the lower control arms 26 near the end adjacent the wheel 14. Each end of the spring member 36 is resiliently mounted on the spring support bracket 39 by a steel backed pad 40 of resilient material such as rubber. Each pad 40 has a steel plate 41 vulcanized on opposite sides through which project bolts 42 that, as shown, serve to securely connect the pad 40 to the end of the spring member 36 and to the support bracket 39. This construction because of its inherent resiliency reduces the vibrations that might otherwise be transmitted to the frame 10. Also, it permits the assembly to withstand shocks of a magnitude that might otherwise tend to destroy a more rigid coupling between the spring member 36 and the support bracket 39.

As shown in Figures 3 and 4 of the drawings, the intermediate portion 43 of the transverse leaf spring 36 is supported out of engagement with the transverse frame member 13. As shown, the intermediate portion 43 of the spring member 36 is positioned underneath and engages the intermediate portion 44 of an upper transverse substantially semi-elliptic leaf spring member 45. The spring members 36 and 45 are provided with deformed centrally located portions 46 and 47 through which a bolt 48 may extend. This construction prevents relative bodily movement between the spring members 36 and 45. However, their ends can flex relative to each other as will be understood readily.

The ends of the upper spring member 45 are secured to the underside of the transverse frame member 13 in a manner that is similar to the attachments of the ends of the lower spring member 36 to the spring support bracket 39. For this purpose a pad 49 is provided having steel plates 50 vulcanized to opposite sides for receiving bolts 51 that, as shown, extend through the transverse frame 13 and the upper spring member 45. This is shown in more detail in Figure 6 of the drawings. A pad 52 of resilient material, such as rubber, may be provided on the underside of the transverse frame member 13 intermediate its ends, as shown, in Figure 4, to cushion the shock incident to the engagement of the upper spring member 45 therewith.

The arrangement of the upper and lower transverse leaf spring members 36 and 45, as described, provides a spring suspension for the frame 10 of the vehicle which has the effect of a floating support and reduces to a marked degree the road shock transmitted through the wheels 14 to the body of the vehicle. At the same time it provides a high degree of stability and the riding qualities of the vehicle are improved greatly.

The degree of resiliency in each of the spring members 36 and 45 can be varied by tapering either the width or thickness or both of the individual leaves from the central or intermediate portions to the outer ends as may be desired.

In Figures 7 and 8 of the drawings, a spring suspension is illustrated that is constructed in accordance with this invention in which the connection is to the upper control arm 16' instead of to the lower control arm 26' as shown in the preceding figures of the drawings and described hereinbefore. In the construction shown in Figure 7, the side rail 12' is slightly different from the side rail 12. Also, a transverse frame member 13' of different construction is employed. However, the upper control arm 16' is rockably mounted at 17 and 18 to the side rail 12' and the upper end of the king pin 19 as described previously. The lower control arm 26' is rockably mounted at 30 on the lower end of the king pin 19 while a straight shaft 27' rockably mounts the other end on brackets 29.

The upper substantially semi-elliptic leaf spring member 45' may be secured against bodily relative movement with respect to the lower substantially semi-elliptic leaf spring member 36' by the transverse bolt 48. Each end of the upper leaf spring member 45' may be secured to the adjacent side rail by the steel backed pad 49 previously described. The bolts 51 serve to make the necessary interconnections.

As described the ends of the lower transverse leaf spring member 36' are connected to the upper control arms 16'. For this purpose a bracket 55, Figure 8, may be provided that is rockably mounted by a bolt 56 that is carried by the upper control arm 16' intermediate its ends. Each end of the lower leaf spring member 36' may be attached to the bracket 55 by the steel back pad 40 described hereinbefore.

The constructions above described provide for a low overall rate of flexing of the pair of leaf springs of each of the spring structures. In the spring art leaf springs are rated by the extent of flexing thereof under a given load. For example, a leaf spring member which is flexed 1 inch by an imposed load of 160 lbs. per square inch is rated at 160. Thus assuming an arbitrary rate R1 of, for example, 8 for leaf spring members 45 or 45' and a like value R2 for leaf spring members 36 or 36' the overall rate for either of the two structures disclosed may be determined by the formula $$\frac{R1 \times R2}{R1 + R2}$$

substituting the above selected arbitrary value for R1 and R2 the overall rate for each of the two spring assemblies is of a value of 4. The resultant low overall rate of the series assembled relation of the pair of leaf spring members in association with the individual wheel suspension has the effect of providing a floating support reducing, as previously mentioned, the road shock transmitted to the vehicle.

Since certain further changes can be made in the foregoing constructions, and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A spring suspension for an automotive vehicle having a frame and upper and lower control members rockably mounted thereon for supporting the front wheels thereof comprising, in combination, a pair of leaf spring members in mutual engagement at their intermediate portions and extending transversely of said frame, means including a pad of resilient material for attaching each end of one leaf spring member to said frame, and means including a pad of resilient material for attaching each end of the other leaf spring member to one of said control members.

2. A spring suspension for an automotive vehicle having a frame and upper and lower control members rockably mounted thereon for supporting the front wheels thereof comprising, in combination, a pair of leaf spring members extending transversely of said frame and out of engagement therewith at their intermediate portions, means holding said leaf spring members in mutual engagement intermediate their ends and preventing relative bodily movement thereof, means including a pad of resilient material for attaching each end of one leaf spring member to said frame, and means including a pad of resilient material for attaching each end of the other leaf spring member to one of said control members.

3. A spring suspension for an automotive vehicle having a frame and upper and lower control members rockably mounted thereon for supporting the front wheels thereof comprising, in combination, upper and lower leaf spring members in mutual engagement intermediate their ends and extending transversely of said frame, means including pads of resilient material for attaching the ends of said upper leaf spring member to said frame, and means including pads of resilient material for attaching the ends of said lower leaf spring member to said lower control members.

4. A spring suspension for an automotive vehicle having a frame and upper and lower control members rockably mounted thereon for supporting the front wheels thereof comprising, in combination, upper and lower leaf spring members extending transversely of said frame and out of engagement therewith at their intermediate portions, means holding said leaf spring members in mutual engagement intermediate their ends and preventing relative bodily movement thereof, means including pads of resilient material for attaching the ends of said upper leaf spring member to said frame, and means including pads of resilient material for attaching the ends of said lower leaf spring member to said lower control members.

5. A spring suspension for an automotive vehicle having a frame and upper and lower control members rockably mounted thereon for supporting the front wheels thereof comprising, in combination, upper and lower leaf spring members in mutual engagement intermediate their ends and extending transversely of said frame, means including pads of resilient material for attaching the ends of said upper leaf spring member to said frame, and means including pads of resilient material for attaching the ends of said lower leaf spring member to said upper control members.

6. A spring suspension for an automotive vehicle having a frame and upper and lower control members rockably mounted thereon for supporting the front wheels thereof comprising, in combination, upper and lower leaf spring members extending transversely of said frame and out of engagement therewith at their intermediate portions, means holding said leaf spring members in mutual engagement intermediate their ends and preventing relative bodily movement thereof, means including pads of resilient material for attaching the ends of said upper leaf spring member to said frame, and means including pads of resilient material for attaching the ends of said lower leaf spring member to said upper control members.

HAROLD E. CHURCHILL.

REFERENCES CITED

The following references are of record in the file of this patent:

UNITED STATES PATENTS

| Number | Name | Date |
| --- | --- | --- |
| 269,565 | Peters et al. | Dec. 26, 1882 |
| 721,912 | Packard et al. | Mar. 3, 1903 |
| 1,564,653 | Weaver | Dec. 8, 1925 |
| 2,043,488 | Peo | June 9, 1936 |
| 2,190,298 | Slack | Feb. 13, 1940 |
| 2,407,236 | Heiney | Sept. 10, 1946 |

FOREIGN PATENTS

| Number | Country | Date |
| --- | --- | --- |
| 965 | Great Britain | 1913 |
| 353,070 | Italy | Oct. 4, 1937 |